United States Patent [19]

McMahon

[11] 4,185,884

[45] Jan. 29, 1980

[54] FOUR PORT OPTICAL INTERNAL REFLECTANCE SWITCHABLE COUPLER

[75] Inventor: Donald H. McMahon, Carlisle, Mass.

[73] Assignee: Sperry Corporation, New York, N.Y.

[21] Appl. No.: 862,456

[22] Filed: Dec. 20, 1977

[51] Int. Cl.² ............................................. G02B 5/14
[52] U.S. Cl. .................................................. 350/96.14
[58] Field of Search ............. 350/96.10, 96.12, 96.13, 350/96.14

[56] References Cited

U.S. PATENT DOCUMENTS

| 3,589,794 | 6/1971 | Marcatilli | 350/96.10 |
| 3,976,358 | 8/1976 | Thompson | 350/96.13 |

OTHER PUBLICATIONS

E. A. Ash, M. L. Dakss, S. C-C. Tseng, "Switchable Optical Waveguide", IBM Technical Disclosure Bulletin, vol. 14, No. 3, Aug. 1971, pp. 999-1000.
R. A. Soref, D. H. McMahon, A. R. Nelson, "Multimode Achromatic Electro-optic Waveguide Switch . . .", Applied Physics Letters, vol. 28, No. 12, Jun. 1976, pp. 716-718.
I. P. Kaminow, L. W. Stulz, E. H. Turner, "Efficient Strip-Waveguide Modulator", Applied Physics Letters, vol. 27, No. 15, Nov. 1975, pp. 555-557.

*Primary Examiner*—Rolf G. Hille
*Attorney, Agent, or Firm*—Howard P. Terry; Seymour Levine

[57] ABSTRACT

A four port apparatus is described for multimode electro-optic switching with reduced voltages relative to that required by the prior art. Two optical waveguides formed on an electro-optic substrate are in parallel relationship for a predetermined length to establish a coupling region, throughout which they are separated by a barrier having an index of refraction formed by, that is, lower than the index of refraction of the optical waveguides. Electrodes extending over the length and thickness of the barrier are deposited on both sides of the electro-optic crystal to which voltages may be applied to provide optical coupling or relatively high optical isolation between the two optical waveguides.

3 Claims, 1 Drawing Figure

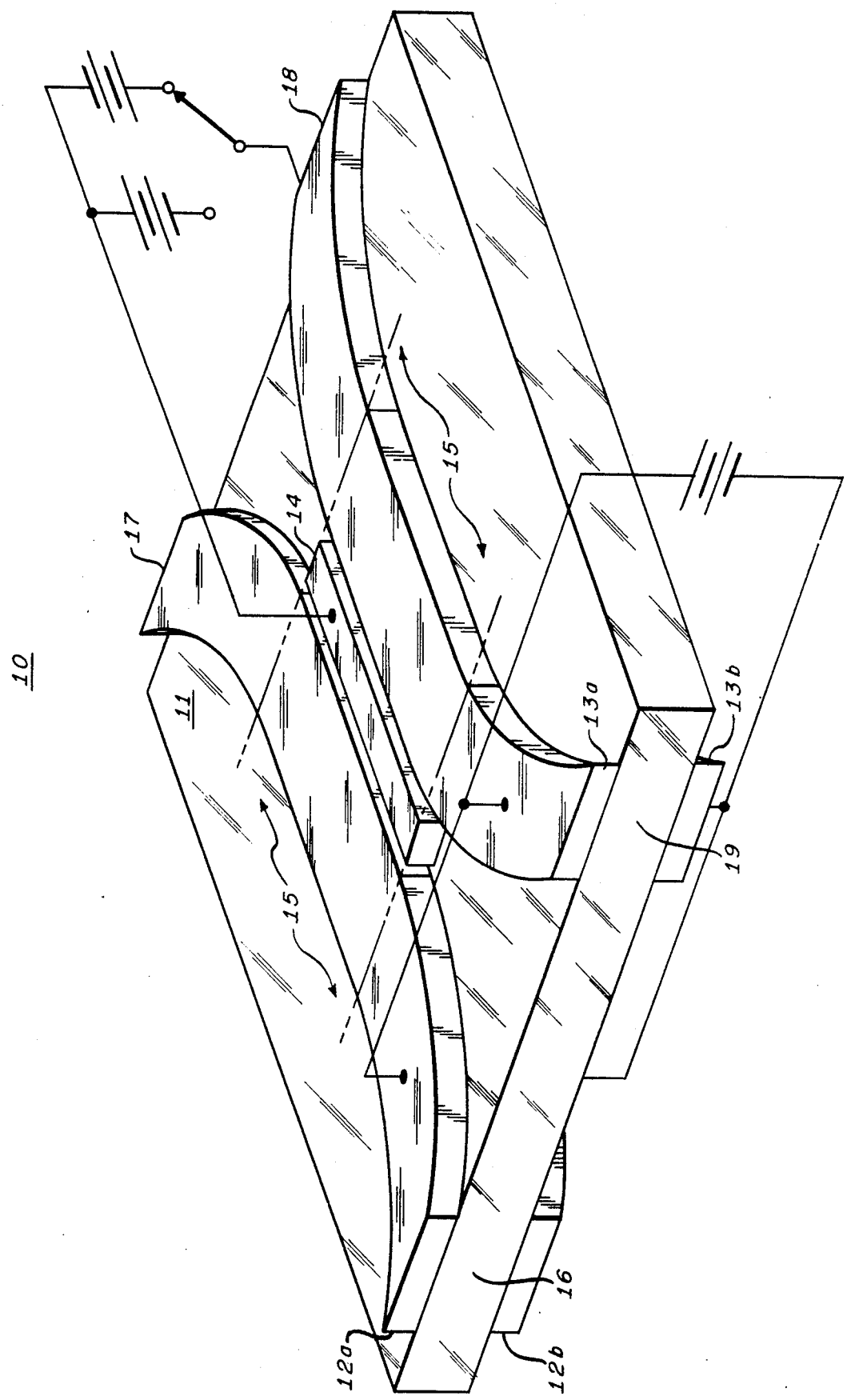

FOUR PORT OPTICAL INTERNAL REFLECTANCE SWITCHABLE COUPLER

BACKGROUND OF THE INVENTION

1. Field of the Invention

This invention relates to optical waveguide couplers and more particularly to switchable optical couplers.

2. Description of the Prior Art

Electro-optic materials such as $LiTaO_3$ and $LiNbO_3$ have been employed to provide induced optical waveguides such as those disclosed in U.S. Pat. Nos. 3,695,745 and 3,795,433. These optical waveguides are formed by the realization of a refractive index change caused by applying a voltage to electrodes positioned on the electro-optic material (substrate) to increase the refractive index between the electrodes relative to the refractive index external thereto. At times the voltage required approaches the breakdown voltage of the substrate and a tenuous operating safety factor exists. An alternative configuration uses pairs of electrodes positioned on either side of the desired channel to which the voltages applied decrease the refractive index between the electrodes relative to that within the desired guiding channel. This configuration, however, may also require voltages near the breakdown voltage of the substrate.

Switchable couplers existing in the prior art with the exception of the coupler described by Soref et al in *Applied Physics Letters*, Volume 28, No. 12 on page 716 all operate with single mode radiation only, such as the coupler described by Burns et al in *Applied Physics*, volume 15, on page 1053. These single mode couplers are interferometric in nature and and must be manufactured to strict tolerances. Soref et al disclose a coupler wherein properly positioned electrodes are deposited on a substrate with a gap therebetween to establish a main channel and a branch channel. A voltage is applied to the main channel electrodes across the thickness of the substrate in a manner to induce a refractive index increase to form a light waveguide between the main channel electrodes. With a reverse voltage or no voltage applied to the branch electrodes, light energy theoretically does not couple to the branch channel. When a voltage that is of equal amplitude and of the same polarity to that coupled to the main channel electrodes is applied to the branch channel electrodes, the light energy propagating in the main channel is caused to divide between the two channels. To effectuate the desired optical waveguides and switching, relatively high voltages must be utilized and switched. This limits the rapidity with which optical energy may be transferred from the main channel to the branch channel and may also exhibit erratic operation if the required voltages approach the breakdown voltage of the substrate.

SUMMARY OF THE INVENTION

The principle of internal reflection at grazing incident angles is utilized to provide electro-optic couplers and switches. The invention provides a switchable directional coupler which includes two optical waveguides formed on an electro-optic crystal by increasing the index of refraction in the optical waveguide regions either by applying a voltage across the crystal or by ion diffusion therein. These two optical waveguides are in parallel relationship for a predetermined length to establish a coupling region wherein they are separated by a barrier, the index of refraction of which is lower than the index of refraction of the regions forming the optical waveguides. Electrodes, which extend over the length and thickness of the barrier, may be deposited on either face of the electro-optic crystal. A voltage of proper amplitude and polarity applied across the crystal via these electrodes will increase the index of refraction in the barrier region to be substantially equal to the index of refraction of the adjacent optical waveguides, allowing light energy to couple therebetween, while a voltage of substantially the same amplitude and opposite polarity will decrease the refractive index in the barrier region, thus providing increased isolation between the optical waveguides.

BRIEF DESCRIPTION OF THE DRAWING

The drawing is a schematic perspective illustration of a coupler switch embodying the principles of the invention.

DESCRIPTION OF THE PREFERRED EMBODIMENT

Referring to FIG. 1, there is shown a coupler switch 10 which comprises a transparent substrate 11 which may comprise a c-axis $LiNbO_3$ of 3 mil thickness. Electrodes (12a, 12b) and (13a, 13b) are deposited on the upper and lower surfaces of the substrate 11 for applying electric fields to portions of the substrate 11 to form optical waveguides through which optical signals may propagate. A third pair of electrodes 14 is deposited on the upper and lower surfaces of the substrate 11 between the electrode pairs (12a, 12b) and (13a, 13b) within the coupling region 15. The voltages applied between the electrodes (12a, 12b) and the electrodes (13a, 13b) are such as to increase the refractive index of the material therebetween above that of the surrounding material. With zero voltage applied between the electrodes 14, this increase in refractive index establishes a barrier along the coupling region which substantially isolates the two optical channels defined by the electrode pairs (12a, 12b) and (13a, 13b), the degree of isolation depending on the separation of the optical channels and the increase in the refractive index induced by the applied voltages. For a given channel separation in the coupling region, additional channel isolation may be achieved by applying a voltage between electrodes 14 that is of opposite polarity to that applied between electrodes (12a, 12b) and (13a, 13b). If a voltage of equal amplitude and phase is applied across the electrodes 14, the refractive index of the substrate 11 induced between electrodes 14 will be substantially equal to the refractive indices between the electrodes (12a, 12b) and (13a, 13b) allowing light energy to intermingle freely between the induced optical channels. With the coupling voltage applied to the electrode 14, light energy coupled to port 16 will divide between the optical waveguides in the coupling region and couple to ports 17 and 18, the coupling coefficient between ports 16 and 18 being dependent upon the length of the coupling region and the divergence of the beam propagating from port 16. Similarly, light energy coupled to port 19 will divide and couple to ports 17 and 18. Since the device is reciprocal, optical energy coupled to port 17 or 18 will divide and couple to ports 16 and 19.

Though the light propagating channels described above are induced by the application of a voltage across the substrate along the desired propagating path, these light guiding channels may also be established by ion diffusion through the entire depth of the substrate along the desired path. This ion diffusion increases the refractive index and eliminates the necessity for the electrode pairs (12a,12b) and (13a,13b). In the coupling region, the channels may be spaced so the diffusion process creates an increase in the refractive index in this region that is approximately one-half that of the refractive index increase at the center of each channel. With no voltage applied to electrodes 14, this increase in refractive index provides a degree of isolation between the channels. Substantially complete channel coupling or isolation may be achieved with the voltage applied to the electrodes 14 of the proper polarity and one-half the amplitude of that which should have been required if the refractive index change to form the propagation channels had been accomplished by means of a voltage applied across the substrate.

Diffused channels, while requiring additional manufacturing steps, have the beneficial property of guiding both TE and TM light polarizations. Due to the fact that the electro-optic effect for TE light is $\frac{1}{3}$ that for TM light, voltages that control TM light switch and/or guide only $\frac{1}{3}$ of the TE light polarization. In an entirely voltage controlled switch structure, effective control of the TM light does not allow for control of the TE light. Hence, higher throughput loss in either channel will result. Moreover, external polarizers may be required (at the fiber-crystal interface) to achieve effective switching action.

Since diffused channels guide both polarizations equally, lower throughput loss will result and both polarizations can be injected into the switch. The electro-optic effect when used with diffused channels will switch all of TM and half of TE polarized light. The result is a more efficient switch structure with lower throughput loss.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. An optical coupling apparatus comprising:
   a substrate of electro-optic material having first and second major surfaces and a refractive index $n_1$;
   first and second means for increasing said refractive index $n_1$ to a refractive index $n_2$ to form first and second optical channels in said substrate;
   said first and second optical guiding channels extending in parallel relationship for a predetermined length with a predetermined separation therebetween to establish a coupling region wherein a refractive index $n_3$ in the order of $(n_2 - n_1)/2$ is realized by ion diffusion; and
   electrode means positioned on said first and second major surfaces of said substrate within the projected area of said coupling region for applying a voltage across said substrate, the application of said voltage with a predetermined polarity causing a refractive index increase with respect to said refractive index $n_3$, and the application of said voltage with a polarity opposite said predetermined polarity causing a refractive index decrease with respect to said refractive index $n_3$.

2. An optical coupling apparatus in accordance with claim 1 wherein said means for forming said first and second optical guiding channels is ion diffusion.

3. An optical coupling apparatus in accordance with claim 1 wherein said means for forming said first and second optical guiding channels includes first and second optical channel electrode means positioned on said first and second major surfaces of said substrate in a pattern substantially outlining the projected area of said first and second optical channels for applying voltages across said substrate of proper polarity and magnitude to establish said refractive index $n_2$ within said substrate whereby said first and second optical guiding channels are formed therein.

* * * * *